(12) United States Patent
Sutherland

(10) Patent No.: US 8,460,143 B2
(45) Date of Patent: Jun. 11, 2013

(54) GEAR-BASED CONTINUOUSLY VARIABLE TRANSMISSION SYSTEMS AND METHODS THEREOF

(71) Applicant: Rochester Institute of Technology, Rochester, NY (US)

(72) Inventor: George Sutherland, Rochester, NY (US)

(73) Assignee: Rochester Institute of Technology, Rochester, NY (US)

( * ) Notice: Subject to any disclaimer, the term of this patent is extended or adjusted under 35 U.S.C. 154(b) by 0 days.

(21) Appl. No.: 13/621,677

(22) Filed: Sep. 17, 2012

(65) Prior Publication Data

US 2013/0017918 A1    Jan. 17, 2013

Related U.S. Application Data

(63) Continuation of application No. 12/500,355, filed on Jul. 9, 2009.

(60) Provisional application No. 61/134,500, filed on Jul. 10, 2008.

(51) Int. Cl.
*F16H 47/08*    (2006.01)

(52) U.S. Cl.
USPC ......................................................... 475/59

(58) Field of Classification Search
USPC .................................... 475/59, 60, 61, 62, 207
See application file for complete search history.

(56) References Cited

U.S. PATENT DOCUMENTS

| 7,297,084 B2 * | 11/2007 | Kimura et al. | 475/59 |
| 7,654,927 B2 * | 2/2010 | Kimura et al. | 475/5 |
| 7,951,033 B2 * | 5/2011 | Abe | 475/5 |
| 2005/0059520 A1 * | 3/2005 | Wodeslavsky | 475/59 |

* cited by examiner

*Primary Examiner* — David D Le
*Assistant Examiner* — David J Hlavka
(74) *Attorney, Agent, or Firm* — Joseph M. Noto; Bond Schoeneck & King PLLC

(57) ABSTRACT

A continuously variable transmission system and a method of making a continuously variable transmission system is described. The present invention includes a gear set having at least a sun gear, one or more planetary gears, and a planetary gear carrier arm on which the one or more planetary gears are mounted for rotational movement. The sun gear and the one or more planetary gears are mounted for rotational engagement and movement with respect to each other, and one of the sun gears and the planetary gear carrier arm couples to an input shaft and another portion of the gear set couples to an output shaft to receive feedback. A rotary coupling unit having an input rotationally coupled to at least one of the one of the sun gears and the planetary gear carrier arm and an output that rotationally couples to the output shaft is also provided.

6 Claims, 5 Drawing Sheets

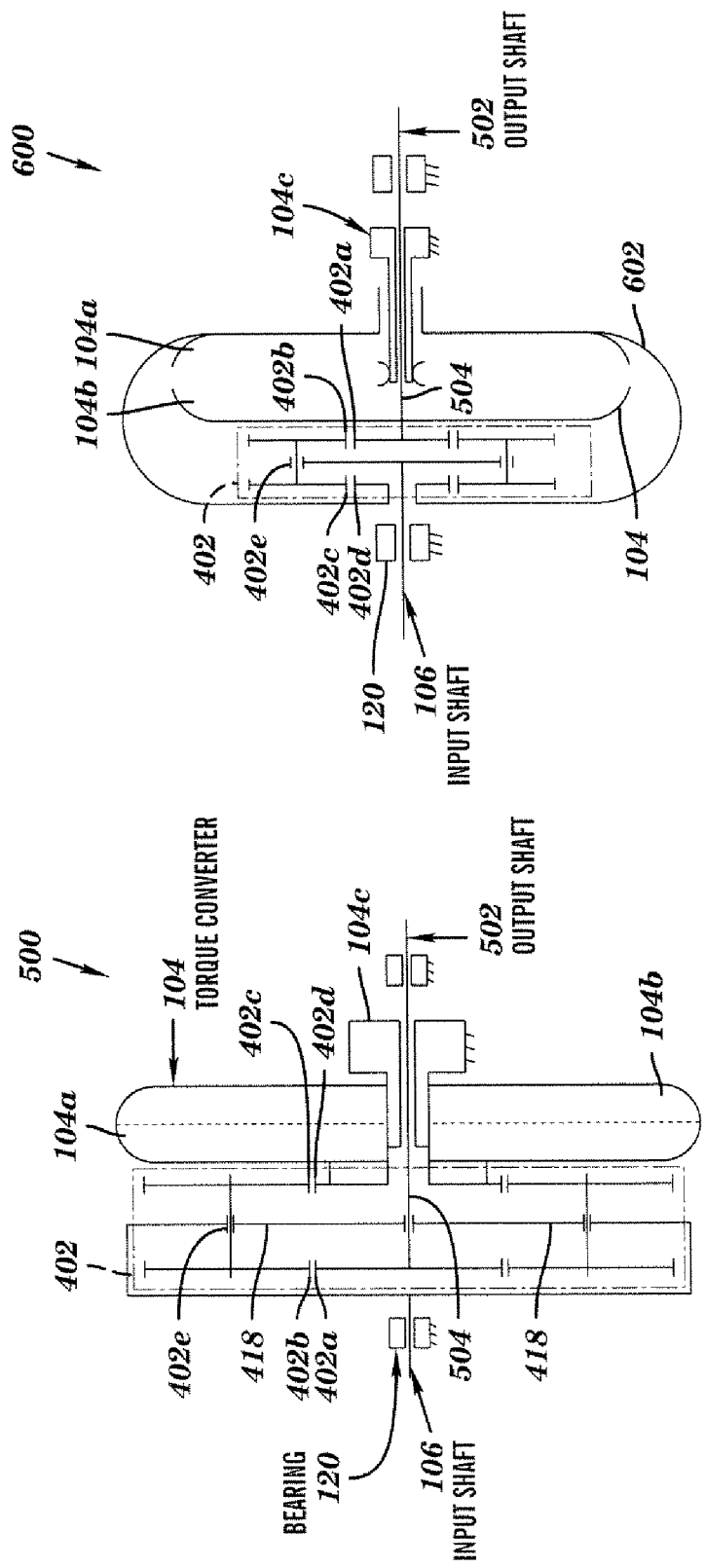

GEAR-BASED CONTINUOUSLY VARIABLE TRANSMISSION SYSTEMS AND METHODS THEREOF

This application is a continuation of U.S. application Ser. No. 12/500,355, filed Jul. 9, 2009, which claims the benefit of U.S. Provisional Application No. 61/134,500, filed Jul. 10, 2008 which are hereby incorporated by reference in their entirety.

FIELD

The present invention relates to transmission systems and, more particularly, to gear-based continuously variable transmission systems and methods thereof.

BACKGROUND

Typically, operating characteristics of a mechanical power source (e.g., an engine) do not match those of a load driven by the power source (e.g., wheels of an automobile). For example, a diesel engine might run most efficiently at 2400 rpm, but a delivery truck running onusing that engine as a power source must operate at speeds between 0 and 60 mph and under different conditions like climbing a hill or accelerating. Mismatch between the power source output speed and the load output speed leads to wastage of energy and a reduction in the overall efficiency. The transmission system is the key component that enables source and load characteristics (e.g., output speeds) to be matched efficiently. Conventional manual and automatic transmissions are a compromise by providing selectable fixed ratios of torque and speed between the source and the load for matching. Automatic transmissions also include a torque converter which connects the power source to various gears, where the best combination of the gears is selected using an external control system. The torque converter smoothes out the changes between different gear combinations and allows the transmission gears to remain engaged when the transmission output is stationary. Manual transmissions include an operator-controlled clutch which must be disengaged by the operator when different gear combinations are selected by the operator. Conventional manual and automatic transmissions use a finite number of gear ratios which are not optimal for all conditions such as varying terrain and output speeds.

The first documented continuously variable transmission was described by Leonardo daVinci in 1490 A.D. As is the case for most modern continuously variable transmission systems, daVinci's continuously variable transmission system used friction between two or more smooth surfaces to achieve an approximately continuously variable output function. Modern day conventional continuously variable transmission systems typically use a belt running between two logic-controlled adjustable sheaves. The belt system is connected to the power source using a torque converter or some form of manual or automatic clutch, depending on the field of application for the transmission. Conventional continuously variable transmission system designs are restricted in the range of gear ratios they can practically provide and usually require additional gear sets following the continuously variable transmission system, in addition to the continuously variable transmission system component itself. Additionally, conventional continuously variable transmission systems and automatic transmissions are single-input-single-output devices.

SUMMARY

A continuously variable transmission system including a gear set having one or more sun gears, one or more planetary gears, and a planetary gear carrier arm on which the one or more planetary gears are mounted for rotational movement. The one or more sun gears and the one or more planetary gears are mounted for rotational engagement and movement with respect to each other, and at least one of the one or more sun gears and the planetary gear carrier arm couples to an input shaft and another portion of the gear set couples to an output shaft to receive feedback. A rotary coupling unit having an input rotationally coupled to the at least one of the one of the one or more sun gears and the planetary gear carrier arm and an output that rotationally couples to the output shaft is also provided.

A method for making a continuously variable transmission system, the method includes providing a gear set having one or more sun gears, one or more planetary gears, and a planetary gear carrier arm on which the one or more planetary gears are mounted for rotational movement. The one or more sun gears and the one or more planetary gears are mounted for rotational engagement and movement with respect to each other, and at least one of the one or more sun gears and the planetary gear carrier arm couples to an input shaft and another portion of the gear set couples to an output shaft to receive feedback. The method includes providing a rotary coupling unit having an input rotationally coupled to the at least one of the one or more sun gears and the planetary gear carrier arm and an output that rotationally couples to the output shaft.

The present invention offers numerous advantages such as providing a wide range of gear ratios using standard components to provide an infinite set of input to output speed ratios and optimal matching for a wide range of operating conditions (e.g., heavy duty as well as light duty applications), without any special electrical, hydraulic or logic controls. The present invention utilizes its own output as a feedback input to the transmission system so that it automatically create a suitable gear ratio for the input and output speeds and loads. Further, according to various embodiments described herein, substantial improvements in packaging and lowering parts count are realized. The present invention provides a highly compact continuously variable transmission system design useful in a wide range of applications from vehicles to heavy construction equipment.

Accordingly, as illustrated by the description herein, the present invention provides a number of advantages including providing built-in feedback of the output angular velocity of an output shaft of a continuously varying transmission system to an input of a gear set of the continuously varying transmission system. Thus, the gear set is put in a mode of being a multi-input system where at least one of the inputs is the fed back output, the at least other input being an input from a power source coupled to the transmission system input shaft.

BRIEF DESCRIPTION OF THE DRAWINGS

FIG. 5 is a side-view elevation schematic diagram of the gear-based continuously variable transmission system of FIG. 4 with a torque converter single extended output shaft in accordance with embodiments of the present invention;

FIG. 6 is a side-view elevation schematic diagram of the gear-based continuously variable transmission system of FIGS. 4 and 5 with a housing surrounding the compound planetary gear set and a rotary coupling unit in accordance with embodiments of the present invention.

DETAILED DESCRIPTION

A continuously variable transmission according to embodiments of the present invention provides an infinite set of possible input to output speed ratios (within fixed limits), and if properly designed and/or controlled can provide optimal matching of input and output speeds for most operating conditions. The continuously variable transmission has applicability to any mechanical power transmission situation where there is variability in the load conditions. Embodiments of this invention provide the continuously variable transmission functionality using only passive components (planetary gears, clutches and a torque converter). A rotary coupling unit according to embodiments of the present invention is preceded by a gear train connected at its first input to a power source (e.g., a mechanical, an electrical, or an electromechanical power source) via an input shaft. An output of the rotary coupling unit is fed back to provide a portion of output rotational energy as a second input to the gear train resulting in a better matching of input and output speeds. By having a torque converter designed with slip and torque multiplication characteristics suitable for a continuously variable transmission configuration and the specific load application, the present invention maximizes overall efficiency of the mechanical system it is employed with, and provides a spatially compact design suitable for use in a diverse range of conditions, as explained below with reference to exemplary embodiments illustrated by FIGS. 1-7 and described herein.

Figure 1:
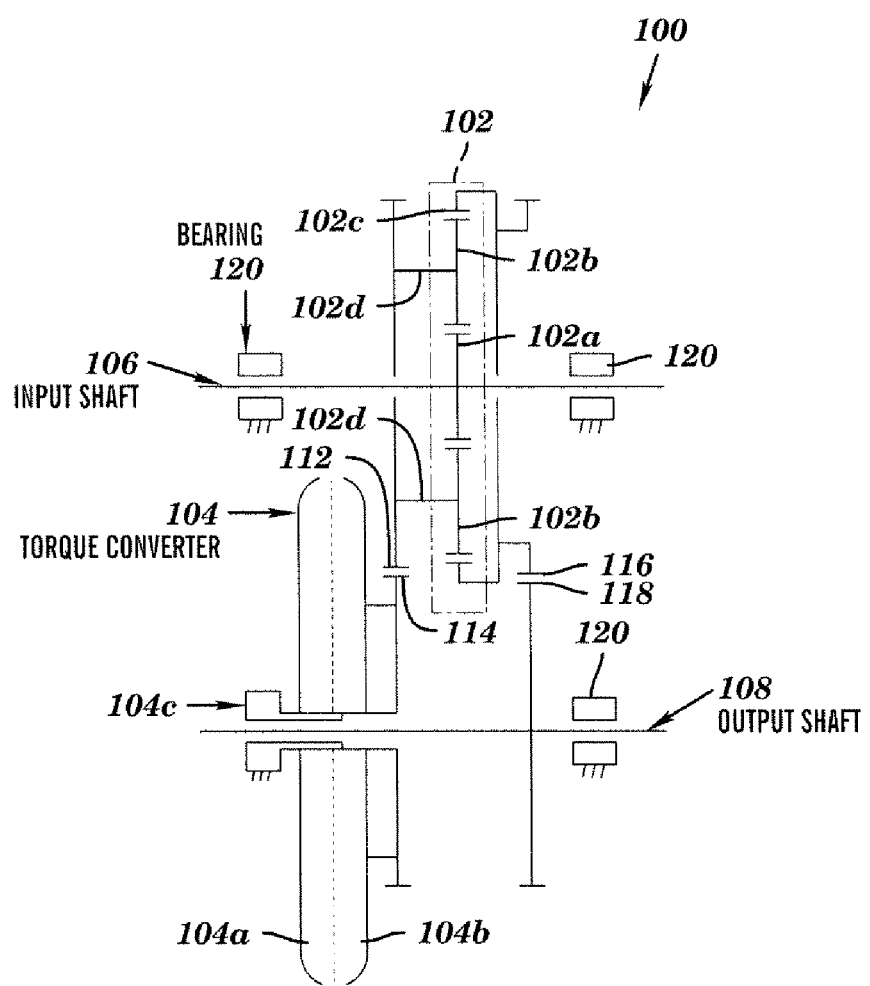
FIG. 1 is a side-view elevation schematic diagram of a gear-based continuously variable transmission system using a planetary gear set in accordance with embodiments of the present invention.

Referring to FIG. 1, a side-view elevation schematic diagram of a gear-based continuously variable transmission system 100 according to embodiments of the invention is shown. According to an exemplary scenario, continuously variable transmission system 100 includes an input shaft 106 that receives an input from a power source to rotate about a first major axis. Input shaft 106 is held spatially by one or more sets of bearings 120 (shown throughout as small rectangular boxes). Input shaft 106 is coupled to a planetary gear set 102 at a sun gear 102a of the planetary gear set 102. Although a single sun gear 102a is shown, depending on specific design and operation, more than one sun gear can also be used. In one example, input shaft 106 is substantially coupled to a geometric center of sun gear 102a, although coupling can take place at other points depending upon specific applications.

Planetary gear set 102 includes a pair of planet gears 102b (also interchangeably referred to as planetary gears 102b herein) rotationally engaged to sun gear 102a at a first point for movement. Although a pair of planet gears 102b is used, more or less number of planet gears 102b can be deployed depending on specific applications. Planet gears 102b are also rotationally engaged to a ring gear 102c at a second point for movement. Ring gear 102c is arranged to circumscribe sun gear 102a and planet gears 102b. Planet gears 102b are coupled to sun gear 102a and to ring gear 102c by sets of teeth, although other techniques for engagement can also be used, such as a belt. Components of planetary gear set 102 are well known to those skilled in the art and therefore will not be described in detail herein.

Planet gears 102b are further rotationally coupled to a driving transfer gear 112 through a planet gear carrier arm 102d (also interchangeably referred to as carrier arm 102d herein) on which planet gears 102b are mounted. In one example, carrier arm 102d is substantially coupled to planet gears 102b at respective geometric centers of planet gears 102b, although coupling can take place at other points depending upon specific applications. Coupling of planet gears 102b to driving transfer gear 112 results in transfer of rotational energy from planet gears 102b to driving transfer gear 112. Driving transfer gear is rotationally coupled to a driven transfer gear 114 for movement. Driven transfer gear 114 rotates in accordance with a rotational motion of driving transfer gear 112.

Driven transfer gear 114 is further rotationally coupled to a torque converter 104 for movement, although driven transfer gear 114 can be coupled to other types of rotary coupling units for example, a fluid coupling unit. Alternatively, other forms of coupling, for example, couplings shown in FIG. 2 that directly couple planet gears 102b to torque converter 104, can also be used. Torque converter 104 includes an impeller 104a that rotates based upon rotational energy transferred by driven transfer gear 114 to torque converter 104. Torque converter 104 includes a fluid that is set into motion by movement of impeller 104a. Motion of the fluid is transferred to a turbine 104b of torque converter 104. To provide efficient flow of the moving fluid into impeller 104a, torque converter 104 includes a stator 104c sharing a substantially common axis of rotation with impeller 104a.

Turbine 104b and impeller 104a share a substantially common geometric axis of rotation. Turbine 104b rotates based upon the motion of the fluid inside torque converter 104 to generate an output angular velocity, as is well known to those skilled in the art. Turbine 104b is rotationally coupled to an output shaft 108 that moves at an output angular velocity. Although an exemplary torque converter 104 is shown in FIG. 1, components of torque converter 104 are well known to those skilled in the art and will not be described in detail herein.

Figure 3:
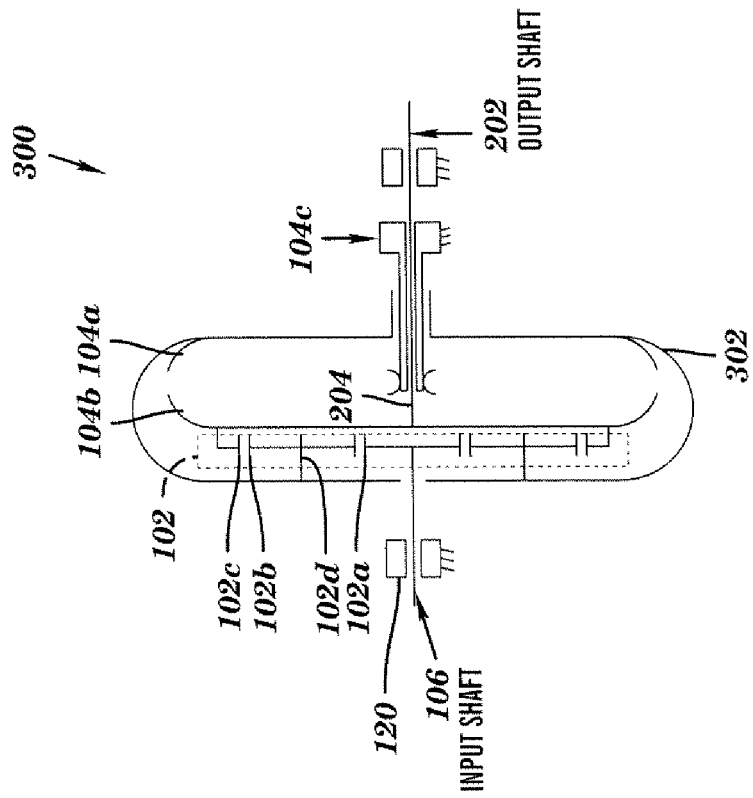
FIG. 3 is a side-view elevation schematic diagram of the gear-based continuously variable transmission system of FIGS. 1 and 2 with a housing surrounding the planetary gear set and a rotary coupling unit in accordance with embodiments of the present invention.

Output shaft 108 forms an output for continuously variable transmission system 100 and can be further coupled to a load (e.g., wheels of an automobile). Output shaft 108 is held in a stable position by one or more bearings 120, similar to input shaft 106. A portion of the output velocity of output shaft 108 is fed back to ring gear 102c by a driving feedback gear 118 rotationally coupled to a driven feedback gear 116 that further couples back to ring gear 102c. The motion of ring gear 102c is modified due to coupling to driven feedback gear 116 and forms a second input to planetary gear set 102. Although only two feedback gears (driving feedback gear 118 and driven feedback gear 116) are shown in FIG. 1, less or more number of gears can be used, depending on specific applications. According to embodiments of the invention, driven feedback gear 116 can be an integral part of ring gear 102c, although other coupling arrangements, such as a belt coupling can also be used. Driven feedback gear 116 and driving feedback gear 118 form a feedback path for output rotational energy to be transferred back to input planetary gear set 102 resulting in an improved speed matching between input and output speeds of continuously variable transmission system 100. Based upon specific applications, a higher number of feedback paths can also be used to provide additional inputs to planetary gear set 102 at different points on planetary gear set 102. It is to be noted that although input shaft 106 and output shaft 108 are shown as geometrically offset from each other along different first and second geometric axes, depending on specific applications, according to various embodiments of the invention, input shaft 106 and output shaft 108 can be substantially located along a common geometrical axis (e.g., as shown in FIGS. 2 and 3).

The present invention in accordance with the various embodiments disclosed herein offers numerous advantages such as providing a wide range of gear ratios using standard components to provide an infinite set of input to output speed ratios and optimal matching for a wide range of operating conditions (e.g., heavy duty as well as light duty applications), without any special electrical, hydraulic or logic controls. As described herein, the present invention utilizes its own output as a feedback input, in addition to an input from the power source, to match output speed of the load to an input speed provided by input shaft 106, or a to match a desired overdrive ratio. Further, according to various embodiments described herein below, the present invention incorporates modified design arrangements of torque converter 104 and planetary gear set 102 that lead to substantial improvements in packaging and lowering parts count leading to a highly compact continuously variable transmission system design useful in a wide range of applications, for example, go-carts, tractors, conveyor systems, vehicles, and heavy construction equipment, to name a few. Furthermore, embodiments of the present invention can be utilized as sub-modules in conjunction with and/or parallel to other types of transmission systems, or can be used as a stand alone independent continuously variable transmission system to drive one or more loads attached to its output.

Figure 2:
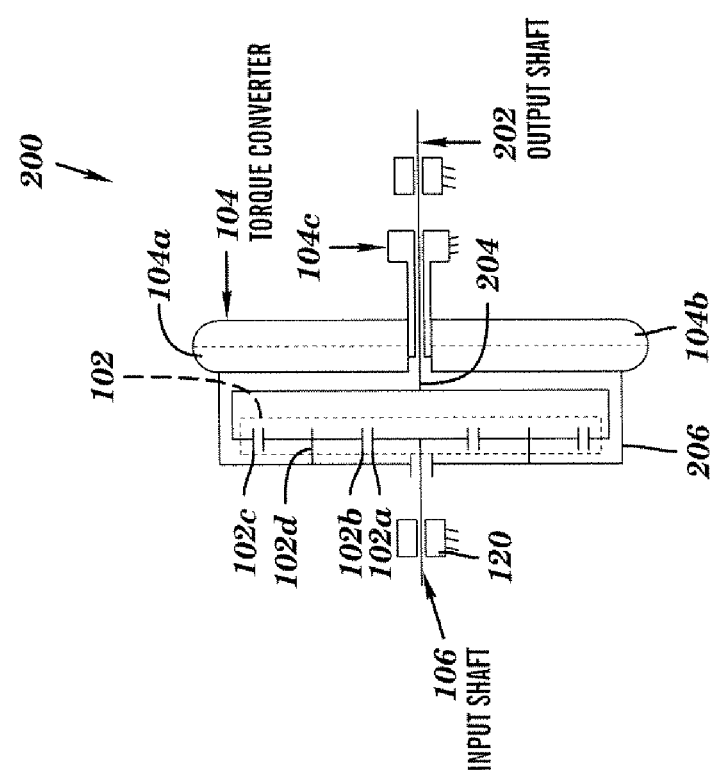
FIG. 2 is a side-view elevation schematic diagram of the gear-based continuously variable transmission system of FIG. 1 with a torque converter single extended output shaft in accordance with embodiments of the present invention.

Referring to FIG. 2, a side-view elevation schematic diagram of a gear-based continuously variable transmission system 200 according to embodiments of the present invention is shown. Continuously variable transmission system 200 shown in FIG. 2 is same as continuously variable transmission system 100 of FIG. 1 except as described herein below. Continuously variable transmission system 200 illustrates a redesigned torque converter 104 and planetary gear set 102 in a compact arrangement. Continuously variable transmission system 200 includes a single output shaft 202 that exits simultaneously from an input side and an output side of torque converter 104. For example, a first portion of output shaft 202 couples to a load (not shown) and a second portion 204 couples to ring gear 102c, as shown in FIG. 2. By directly coupling output shaft 202 to ring gear 102c using second portion 204 of output shaft 202, the exemplary configuration shown in FIG. 2 eliminates use of driving feedback gear 118 and driven feedback gear 116 of continuously variable transmission system 100 in FIG. 1, and therefore, achieves the same functionality with lesser number of parts and a more compact design as compared to continuously variable transmission system 100.

Further, in FIG. 2, output shaft 202 and input shaft 106 are aligned in a manner such that they share a substantially common geometric axis of rotation, although they can be equally operational with their corresponding geometric axes offset from each other. A housing 206 of torque converter 104 is coupled to planet gears 102b using carrier arm 102d on which planet gears 102b are mounted. Housing 206 is an extension of torque converter 104 and is coupled to provide an input to torque converter 104 at impeller 104a of torque converter 104. As a result of the rearrangement shown in FIG. 2, where housing 206 couples the rotational output of planet gears 102b to provide a rotational input to impeller 104a, driving transfer gear 112 and driven transfer gear 114 of FIG. 1 are both eliminated from the design of continuously variable transmission system 200. Thus, continuously variable transmission system 200 provides compactness of design in ways more than one as described immediately above. In all other aspects, continuously variable transmission system 200 is the same as continuously variable transmission system 100. For example, internal components of planetary gear set 102 and torque converter 104 are substantially the same as continuously variable transmission system 100, except as described above, and are therefore not being described again herein.

Referring to FIG. 3, a side-view elevation schematic diagram of a gear-based continuously variable transmission system 300 according to other embodiments of the invention is shown. Continuously variable transmission system 300 is the same as continuously variable transmission system 100 and continuously variable transmission system 200 of FIGS. 1 and 2, respectively, except as described herein below. In continuously variable transmission system 300, output shaft 202 is identical to output shaft 202 of FIG. 2 except output shaft 202 is directly coupled to turbine 104b of torque converter 104 and turbine 104b is directly coupled to ring gear 102c. Therefore, by redesigning torque converter 104 such that turbine 104b directly provides at least a portion of output from output shaft 202 to ring gear 102c, further compactness of design is attained.

Additionally, impeller 104a is modified to integrally form a housing 302 that couples to carrier arm 102d to provide an input to torque converter 104 at impeller 104a, although housing 302 can also provide input(s) to impeller 104a at other parts of planetary gear set 102, e.g., at sun gear 102a. In all other aspects, continuously variable transmission system 300 is the same as continuously variable transmission system 100 and continuously variable transmission system 200 of FIGS. 1 and 2, respectively, except as described immediately above.

Figure 4:
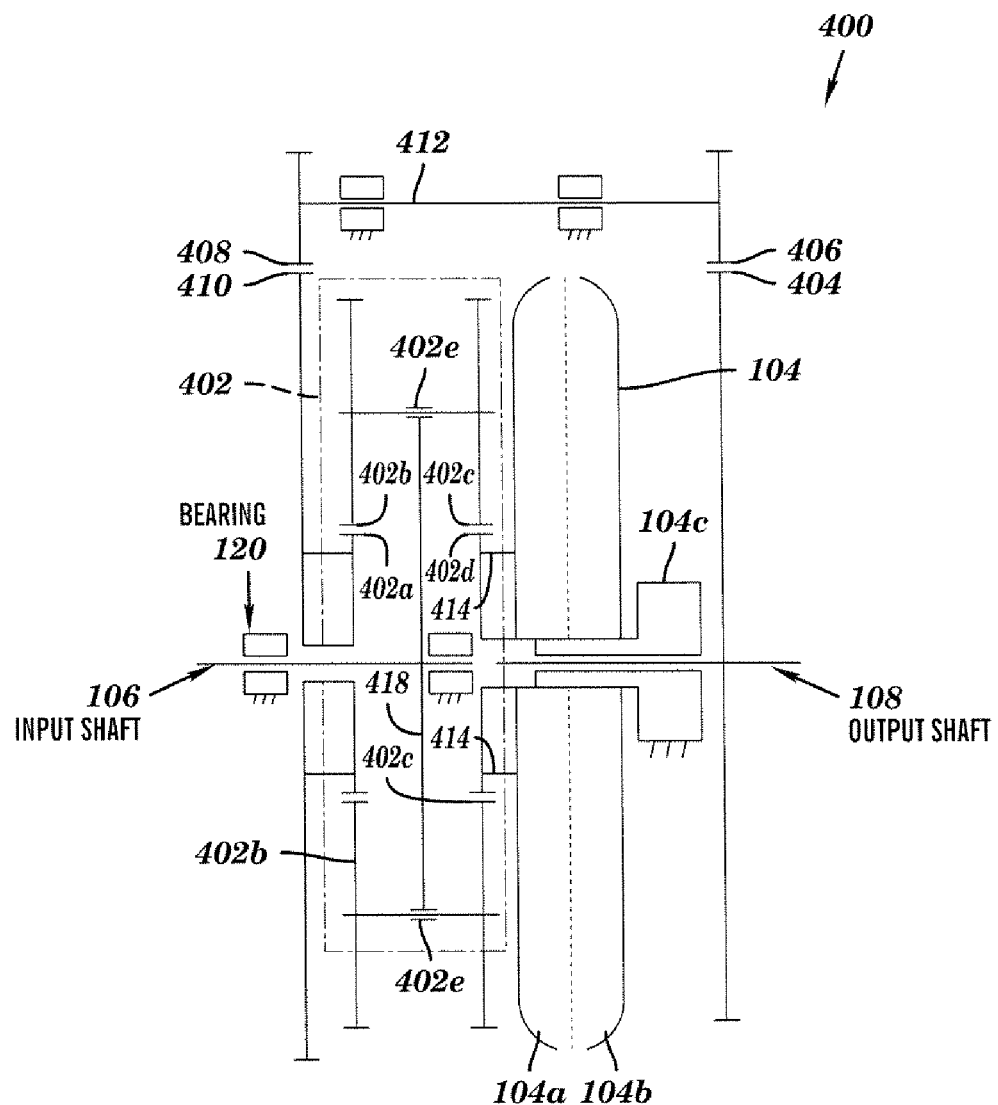
FIG. 4 is a side-view elevation schematic diagram of a gear-based continuously variable transmission system using a compound planetary gear set in accordance with other embodiments of the present invention.

Referring to FIG. 4, a side-view elevation schematic diagram of a gear-based continuously variable transmission system 400 according to embodiments of the invention is shown. Continuously variable transmission system 400 includes an input shaft 106 (which is same as input shaft 106 of FIGS. 1-3) that provides a first rotational input to a compound planetary gear set 402. More specifically, input shaft 106 is rotationally coupled to a carrier arm component 418 and a carrier arm component 402e, of compound planetary gear set 402, although input shaft 106 can also be coupled to other parts of compound planetary gear set 402, e.g., to driving planet gears 402b. Carrier arm component 402e guides the shaft that rotationally couples a first pair of driving planet gears 402b and a second pair of driven planet gears 402c. First pair of driving planet gears 402b rotationally couple to a feedback sun gear 402a in an arrangement the same as sun gear 102a and planet gears 102b of FIG. 1 except that compound planetary gear set 402 does not include a ring gear. Instead, first pair of driving planet gears 402b is rotationally coupled to a second pair of driven planet gears 402c by a common shaft, which is guided by carrier arm component 402e in a circular orbit, as shown in FIG. 4.

Driven planet gears 402c are further rotationally coupled to a driven sun gear 402d for movement. Driven sun gear 402d is rotationally coupled to impeller 104a of torque converter 104 by arm 414 to provide an input to torque converter 104 at impeller 104a. Internal operation of torque converter 104, including operation of turbine 104b and stator 104c, is essentially same as described in FIG. 1 and will not be repeated here again.

Output rotational motion of turbine 104b is coupled to output shaft 108 that drives a load (not shown). Output shaft 108 also rotationally couples to a driving intermediate feedback gear 404, although driving intermediate feedback gear 404 can optionally be driven by an output from turbine 104b. Driving intermediate feedback gear 404 couples to a feedback shaft 412 through a first intermediate feedback gear 406 and rotates feedback shaft 412 based upon the output angular motion of output shaft 108. Feedback shaft 412 is coupled to a second intermediate feedback gear 408 on an input side of continuously variable transmission system 400.

Second intermediate feedback gear 408 further couples to a feedback gear 410 integral to feedback sun gear 402a of compound planetary gear set 402 to provide a second input to compound planetary gear set 402. Although feedback shaft 412 is shown having two gears, less or more number of gears can be used, depending on specific applications. Therefore, via inputs from feedback shaft 412 and input shaft 106, composite motion of compound planetary gear set 402 is modulated such that input and output speeds of continuously variable transmission system 400 are automatically controlled. According to one embodiment of the invention, without any additional complexity, compound planetary gear set 402 can provide a gear ratio of 100:1, and when used in the continuously variable transmission system 400 configuration can smoothly change gear ratios from 100:1 to an overdrive ratio of 0.5:1 as an output speed of a load (e.g., wheels of a vehicle) coupled to output shaft 108 increases.

Referring to FIG. 5, a side-view elevation schematic diagram of a gear-based continuously variable transmission system 500 according to embodiments of the present invention is shown. Continuously variable transmission system 500 is the same as continuously variable transmission system 400 of FIG. 4 except as described herein below. Continuously variable transmission system 500 includes an input shaft 106 integrally coupled to carrier arm component 402e and carrier arm component 418 of compound planetary gear set 402. Input received by carrier arm 402e drives the common rotational shaft for driving planet gears 402b and a pair of driven planet gears 402c in a circular orbit. The pair of driven planet gears 402c is then rotationally coupled to driven sun gear 402d, the same as in continuously variable transmission system 400 of FIG. 4. Operation of components of torque converter 104 are same as described in FIG. 4, except that output shaft 502 is coupled directly to feedback sun gear 402a via an extension 504 to provide at least a portion of output of torque converter 104 as an additional input to compound planetary gear set 402. Therefore, the configuration shown in FIG. 5 achieves the same functionality as the configuration of FIG. 4 except that no feedback shaft 412 and no first and second feedback gears 406 and 408 (shown in FIG. 4) are required. As a result of elimination of these gears, a simpler design with lesser components is achieved.

Referring to FIG. 6, a side-view elevation schematic diagram of a gear-based continuously variable transmission system 600 according to embodiments of the present invention is shown. Continuously variable transmission system 600 is same as continuously variable transmission system 400 except as described herein below. Continuously variable transmission system 600 comprises housing 602 coupled to impeller 104a that provides input to impeller 104a. Coupling of output shaft 502 to turbine 104b is same as FIG. 3 and is not being repeated herein. However, since continuously variable transmission system 600 includes compound planetary gear set 402 as compared to planetary gear set 102 of FIG. 3, coupling of turbine 104b to provide feedback as a second input to compound planetary gear set 402 occurs at driven sun gear 402d where turbine 104b couples to compound planetary gear set 402. As described earlier with respect to FIG. 5, the arrangement shown in FIG. 6 achieves the same functionality as the configuration of FIG. 4 except that no feedback shaft 412 and no first and second intermediate feedback gears 406 and 408 (shown in FIG. 4) are required. As a result of elimination of these gears, a simpler design with lesser components is achieved. In addition, presence of housing 602 makes the design of continuously variable transmission system 600 more compact.

Figure 7:
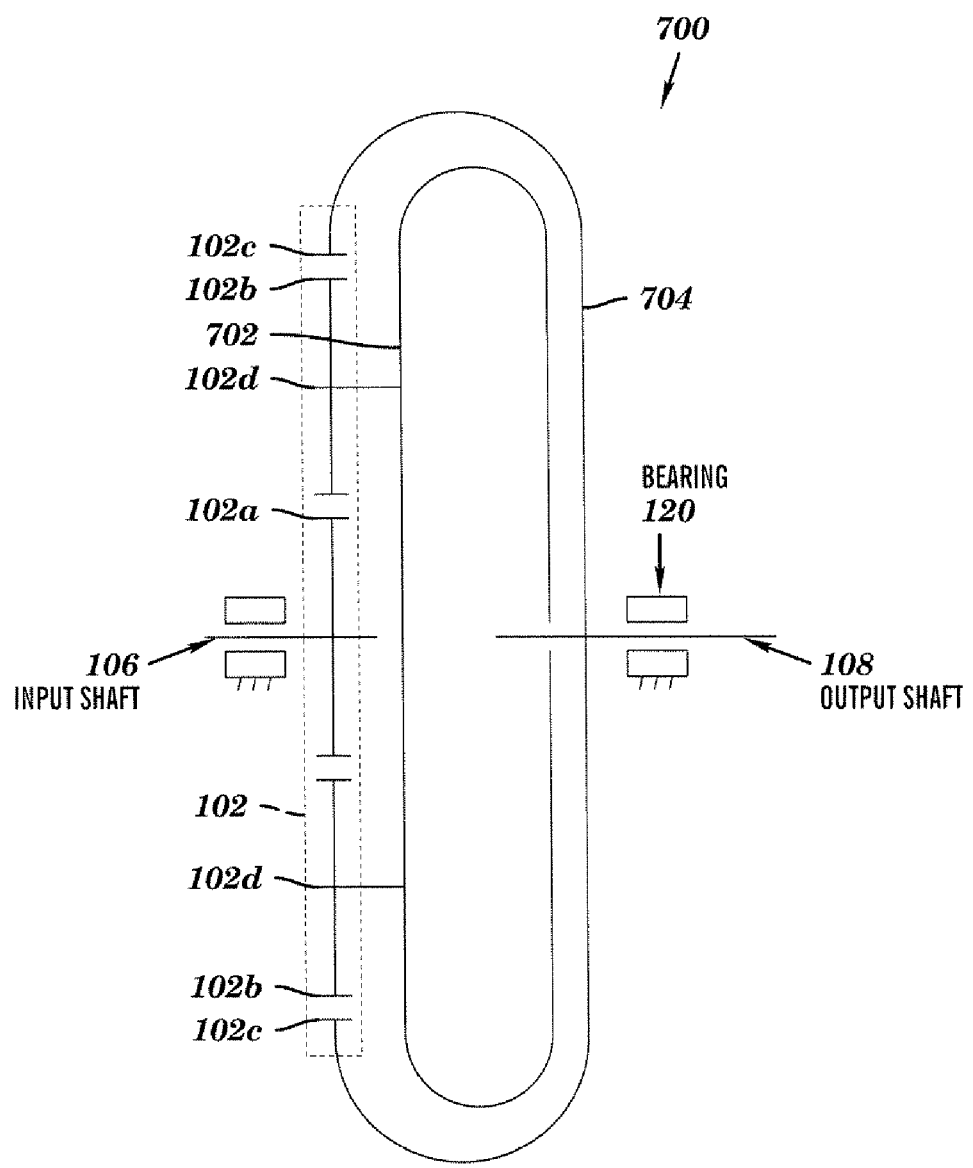
FIG. 7 is a side-view elevation schematic diagram of a compact, gear-based continuously variable transmission system with a fluid coupling unit in accordance with other embodiments of the present invention.

Referring to FIG. 7, a side-view elevation schematic diagram of a gear-based continuously variable transmission system 700 according to embodiments of the present invention is shown. Continuously variable transmission system 700 is same as continuously variable transmission system 300 except as described herein below. Continuously variable transmission system 700 includes a fluid coupling unit 702 instead of torque converter 104 of FIGS. 1-6. On the input side of continuously variable transmission system 700, planet gears 102b rotationally couple to fluid coupling unit 702 via carrier arm 102d to provide input from input shaft 106. Continuously variable transmission system 700 includes a feedback shell 704 rotationally coupled to output shaft 108 to provide a portion of rotational output to ring gear 102c. According to one embodiment of the invention, feedback shell 704 can be an integral part of ring gear 102c. Although fluid coupling unit 702 is shown coupled to planetary gear set 102 described in FIG. 1, fluid coupling unit 702 can be designed to receive an input from a compound planetary gear set such as compound planetary gear set 402 of FIG. 4. Internal functioning of fluid coupling unit 706 is well known to those skilled in the art and will not be described herein. Thus, continuously variable transmission system 700 provides a closed feedback loop comprising a first input from input shaft 106 to planetary gear set 102 being further provided as an input to fluid coupling unit 702 that generates an output rotational motion of the output shaft 108, which rotational motion is fed back to planetary gear set 102 though feedback shell 704 at ring gear 102c to provide a second input to planetary gear set 102. The arrangement shown in continuously variable transmission system 700 results in a compact design with very low parts count for matching input speed of a mechanical power source to an output speed.

Although specific exemplary arrangements of continuously variable transmission systems 100-700 are illustrated and described, various permutations and combinations of these arrangements can also be applied in which a portion of an output generated is fed back as an additional input to a gear set which is first in line from the power source. Such additional exemplary embodiments can be contemplated by those skilled in the art after reading this disclosure, without departing from the basic design and operation of various embodiments of this invention.

According to one exemplary scenario, continuously variable transmission system 100, continuously variable transmission system 200, continuously variable transmission system 300, and continuously variable transmission system 700 are utilized for light duty loads (e.g., cars) and continuously variable transmission system 400, continuously variable transmission system 500, and continuously variable transmission system 600 are utilized for heavy duty loads. Although elements of FIGS. 1-7 are shown as of fixed relative dimensions, such dimensions are can be changed according to specific applications. For example, larger or smaller gear sets may be utilized depending on type of load being driven by a continuously variable transmission. Further, as and when needed, additional clutches, brakes, belts, and bearings can optionally be used to provide mechanical control and support to the continuously variable transmission systems 100-700 described in FIGS. 1-7.

Referring to FIGS. 1-7, a method of making and using a continuous variable transmission will be described with respect to functioning and operation of various components of FIGS. 1-7. A method for making a continuously variable transmission system, the method includes providing a gear set having one or more sun gears, one or more planetary gears, and a planetary gear carrier arm on which the one or more planetary gears are mounted for rotational movement. The one or more sun gears and the one or more planetary gears are mounted for rotational engagement and movement with respect to each other, and at least one of the one or more sun gears and the planetary gear carrier arm couples to an input shaft and another portion of the gear set couples to an output shaft to receive feedback. The method includes providing a rotary coupling unit having an input rotationally coupled to the at least one of the one or more sun gears and the planetary gear carrier arm and an output that rotationally couples to the output shaft.

Continuous variable systems 100 and 400 both receive angular motion from input shaft 106. This angular motion is due to input shaft 106 receiving an output from a power source (e.g., a manual power source, an engine, motor or other types of propulsion units well known to those skilled in the art). With respect to FIG. 1, this angular motion is transmitted by input shaft 106 to sun gear 102*a* which rotates as a result of the transmission of rotational energy from input shaft 106. Due to the coupling of sun gear 102*a* with planet gears 102*b*, as described above, planet gears 102*b* also rotate. Rotation speeds of sun gear 102*a* and planet gears 102*b* will depend upon various factors such as gear ratios and mechanical properties of individual planet gears 102*b* and sun gear 102*a*, as is well known to those skilled in the art. Rotation of planet gears 102*b* results in rotation of ring gear 102*c*, although ring gear 102*c* can be kept in a fixed motionless state relative to planet gears 102*b*. Rotation of planet gears 102*b* also causes carrier arm 102*d* to rotate. Carrier arm 102*d* then passes the rotational energy of planet gears 102*b* by coupling to driving transfer gear 112 which further rotates driven transfer gear 114. Driving transfer gear 112 and driven transfer gear 114 form the second input to impeller 104*a* of torque converter 104 (or, to fluid coupling unit 702 for FIG. 7, depending on which form of rotary coupling unit is used).

Rotation of impeller 104*a* causes rotation of turbine 104*b* of torque converter 104. Such an internal transfer of rotational energy in torque converter 104 occurs via fluidic transfer of energy, well known to those skilled in the art and not described further herein. Rotation of turbine 104*b* causes output shaft 108 coupled to turbine 104*b* to rotate and deliver an output to a load (e.g., wheels of a car). A portion of the rotational energy of output shaft 108 is fed back as a second input to planetary gear set 102 at ring gear 102*c*. The feedback path comprises coupling of output shaft 108's rotational energy from driving feedback gear 118 to driven feedback gear 116 which rotates ring gear 102*c*. Thus, by providing at least a portion of rotational output of output shaft 108, input rotational motion of planetary gear set 102, and hence that of torque converter 104, is modulated. Once input and output speeds of input shaft 106 and output shaft 108, respectively, substantially match, driving feedback gear 118 and driven feedback gear 116 can optionally be de-clutched from output shaft 108 and ring gear 102*c*, respectively. The de-clutching can be performed, for example, using additional clutches.

Operation of continuously variable transmission system 200 is same as the operation of continuously variable transmission system 100 except as described herein. A modification in the design of output shaft 202 so that it integrally forms a part of ring gear 102*c* results in an elimination of a feedback coupling unit formed by driving feedback gear 118 and driven feedback gear 116 of FIG. 1. Further, aligning the geometric axis of rotation of output shaft 108 with the geometric axis of rotation of input shaft 106 results in a more compact design of continuously variable transmission system 200. Rotation of housing 206 coupled to impeller 104*a* of torque converter 104 also results in housing 206 providing an input to impeller 104*a* thereby eliminating driving transfer gear 112 and driven transfer gear 114 of FIG. 1.

Operation of continuously variable transmission system 300 is same as continuously variable transmission system 200 and continuously variable transmission system 100 except as described herein. In continuously variable transmission system 300, housing 302 provides the rotational input to impeller 104*a* of torque converter 104. Housing 302 derives the rotational motion from planet gear carrier arm 102*d*, which rotates as described above with respect to FIGS. 1 and 2. Another difference between the operation of continuously variable transmission system 300 and the operation of continuously variable transmission system 200 is that instead of output shaft 202 connecting to ring gear 102*c* at second portion 204, turbine 104*b* directly couples rotational output to ring gear 102*c*, thereby further simplifying the design of continuously variable transmission system 300. Thus, rotation of turbine 104*b* modulates rotation of planetary gear set 102 until speed of input shaft 106 matches output speed of output shaft 202, or until a desired overdrive ratio for continuously variable transmission system 300 is attained.

Operation of continuously variable transmission system 400 will now be described in detail with reference to FIG. 4. As described earlier, continuously variable transmission system 400 includes compound planetary gear set 402 instead of planetary gear set 102 with ring gear 102*c*. Input shaft 106 receives rotational motion from a power source and provides this rotational motion via carrier arm component 418 to carrier arm component 402*e* which rotates the first pair of driving planet gears 402*b* and the second pair of driven planet gears 402*c*. The second pair of driven planet gears 402*c* rotates to engage and further rotate driven sun gear 402*d*. Driven sun gear 402*d* further rotates impeller 104*a* which drives turbine 104*b* to set output shaft 108 in a rotational motion. Output shaft 108 rotates the driving intermediate feedback gear 404 which further rotates feedback shaft 412 via first intermediate feedback gear 406. Second intermediate feedback gear 408 attached to feedback shaft 412 then rotates integral feedback gear 410 to further rotate feedback sun gear 402*a*, thereby providing a feed back input to continuously variable transmission system 400 in addition to the input from input shaft 106. Such feedback is continuously provided until output shaft 108 speed matches input shaft 106 speed.

In an exemplary scenario, feedback sun gear 402*a* can rotate in a first direction depending on specific instantaneous input and output speeds of continuously variable transmission system 400, or can rotate in an opposite second direction as input and output speeds change.

The design of compound planetary gear set 402 is incorporated into continuously variable transmission system 200 and continuously variable transmission system 300 to result in continuously variable transmission system 500 and continuously variable transmission system 600, respectively.

Continuously variable transmission system 500 and continuously variable transmission system 600 function exactly same as their respective counterparts in FIGS. 2 and 3, except they incorporate compound planetary gear set 402, operation of which is described with respect to continuously variable transmission system 400. Thus, after reading the operation of continuously variable transmission systems 200-400, one skilled in the art can understand the operation of continuously variable transmission systems 500-600, and their operation and method of making will not be described in further detail herein.

Operation of continuously variable transmission system 700 will now be described with reference to FIG. 7. Although operation of continuously variable transmission system 700 is being described using a design with planetary gear set 102, operation of continuously variable transmission system 700 with compound planetary gear set 402 design can also be understood by one skilled in the art, after reading this disclosure. In continuously variable transmission system 700, input shaft 106 transmits rotational motion to sun gear 102a, which further rotates planet gears 102b. Carrier arm 102d attached to planet gears 102b transmits the rotational motion as an input to fluid coupling unit 702 which rotates freely to generate an output angular velocity of output shaft 108. Angular output velocity of output shaft 108 is transmitted back in a feedback loop to ring gear 102c which is integrally attached to feedback shell 704. Rotation of feedback shell 704 causes a modulation in rotation of planetary gear set 102 via ring gear 102c. Thus, a portion of the output velocity of output shaft 108 is fed back as an additional input to planetary gear set 102 until the input speed of input shaft 106 matches the output speed of output shaft 108 Once a desired matching condition is attained between the input and the output of continuously variable transmission system 700, feedback shell 704 can optionally be declutched such that continuously variable transmission system 700 becomes an open loop direct drive system.

Referring again to FIGS. 1 and 4, two exemplary configurations for a continuously variable transmission system in accordance with embodiments of the present invention are described. For the first configuration described in FIG. 1, a gear set used this invention can be either a single planetary gear set (planetary gear set 102) with ring gear 102c, or, as shown in FIG. 4, the gear set can be compound planetary gear set 402 with no ring gear.

The second configuration is that torque converter 104 and planetary gear set 102 (or compound planetary gear set 104) can either be on the same geometric axis (e.g., for rear-drive vehicle applications) or torque converter 104 and planetary gear set 102 (or compound planetary gear set 104) can each be on different geometric axes (e.g., for front-drive vehicle applications). By way of example only, FIG. 1 shows a combination that would be good for light-duty front drive applications, like a typical passenger car, and FIG. 4 shows a combination that would be good for a heavy-duty application, like an intercity transport truck. The particular application would determine the size and material of the gear set and torque converter 104.

For the configuration of continuously variable transmission system 100 of FIG. 1, an effective planetary gear set 102 ratio (which is an input angular velocity of input shaft 106 divided by the angular velocity of impeller 104a) is given by the formula:

$$GR = OR \cdot (1+PR)/[1+(PR \cdot SR)]$$

where SR=the slip ratio for torque converter 104 (which is output angular velocity of turbine 104b divided by its input angular velocity of impeller 104a), PR (the planet ratio)= $(N_{102a}+2 \cdot N_{102b})/N_{102a}$, OR (the overdrive ratio)= $N_{114}/N_{112}$, and $N_i$ is the number of teeth in a gear i of FIG. 1 (where the subscript denotes element number in FIG. 1).

It is to be noted that a feedback gear ratio ($N_{116}/N_{118}$), corresponding to driving feedback gear 118 and driven feedback gear 116, must be equal to OR. When continuous variable transmission 100 is in a "drive" mode and output shaft 108 is held stationary by applying external brakes (corresponding to an exemplary starting situation), SR=0 and GR=OR·(1+PR). For example, for a light duty application, a typical value for PR and OR would be 4 and 0.7 respectively. In this case, at startup GR=3.5. When a load attached to output shaft 108 achieves a standard operating speed and torque converter 104 is in a "locked up" state, SR=1 and GR=0.7. The value for GR will vary continuously in between these two extremes (3.5 and 0.7) in response to angular speed of output shaft 108 and torques acting on torque converter 104.

Planetary gear set 102 acts as a variable amplifier of torque converter 104's slip ratio and torque multiplication characteristics. The ratio of the continuously variable transmission system 100 input angular velocity to output angular velocity would be GR divided by SR, which would be infinite when the load is stationary and equal to OR when torque converter 104 is "locked up" and the load is travelling at its normal operating speed beyond start-up conditions.

For the configuration of continuously variable transmission system 400 of FIG. 4, the effective gear ratio for the compound planetary gear set 402 is given by the formula:

$$GR = [1/(1-PR)] \cdot [1-(FR \cdot PR \cdot SR)]$$

where PR (the planet ratio)= $N_{402a}N_{402c}/N_{402b}N_{402d}$, FR (feedback ratio)= $N_{404}N_{408}/N_{406}N_{410}$, and $N_i$ is the number of teeth in an $i^{th}$ gear of FIG. 4 (where the subscript denotes corresponding element numbers in FIG. 4).

To have a high gear output ratio be nominally 1:1, intermediate feedback gears 406 and 408 making a feedback loop should have a feedback gear ratio FR=1. For example, to have an overdrive final gear ratio of 0.7:1, FR would need to be slightly greater than one, the exact number depending on the value selected for PR. For the case of a heavy duty truck, for example, a typical value for start-up gearing would be 10:1 and for an overdrive ratio 0.7:1. Values of PR and FR to achieve this typical case are 0.9 and 1.03, respectively.

For example configurations of continuously variable transmission systems 100 and 400, as long as the OR, PR and FR values are satisfied, the particular values for $N_i$ would be dictated by packaging and strength considerations. Similarly, values of OR, PR and FR can also be determined for continuously variable transmission systems 200, 300, 500, 600, and 700 of FIGS. 2, 3, 5, 6, and 7, respectively.

Various exemplary modes of operation of continuously variable transmission systems 100 and 400 with continuing reference to FIGS. 1 and 4 will now be described, although the present invention can be used in other modes too, according to various embodiments of the present invention described herein. Although the exemplary modes described below are described with reference to continuously variable transmission systems 100 and 400 of FIGS. 1 and 4, respectively, in view of the disclosure above, these exemplary modes can be equally applied to continuously variable transmission systems 200, 300, 500, 600, and 700 of FIGS. 2, 3, 5, 6, and 7, respectively.

1. Neutral mode: Various exemplary design options exist for declutching the continuously variable transmission systems 100 and 400 from an input power source (e.g., an engine) to achieve a neutral mode. When in neutral, it is desirable to have torque converter 104 spinning and full of hydraulic fluid so that when a "drive" position later selected, torque converter 104 is immediately available to transmit power without any time lag. This can be accomplished for both continuously variable transmission systems 100 and 400, optionally using a combination of clutches, where turbine 104b coupled to output shaft 108, and feedback gears such as driving feedback gear 118, driven feedback gear 116, driving intermediate feedback gear 404, first intermediate feedback gear 406, second intermediate feedback gear 408, feedback gear 410 are declutched but impeller 104a receives input from input shaft 106 via planetary gear set 102 or compound planetary gear set 402.

2. Reverse mode: A reverse mode can be achieved in two exemplary ways, as described herein. The first way is through modifications to torque converter 104 that facilitate it being able to transmit torque when operated in a direction reverse from its normal operation direction. In one scenario, an over-running clutch combined with a centrifugal clutch can be used. In this case, for the continuously variable transmission 100 of FIG. 1, a brake holds carrier arm 102d stationary, driving transfer gear 112 is declutched from impeller 104a, and driving feedback gear 118 is declutched for output shaft 108 coupled to turbine 104b and clutched to an input to impeller 104a. With these actions taking place, the gear ratio for the planetary gear 102 in this scenario is:

$GR_{R1} = -(N_{102c} \cdot N_{118})/(N_{102a} \cdot N_{116})$, where the subscript R1 denotes reverse mode of FIG. 1, and other subscripts denote corresponding element numbers in FIG. 1.

Similarly, for the continuously variable transmission system 400 of FIG. 4, reverse mode can be achieved by (1) declutching driven sun gear 402d from the impeller 104a and fixing driven sun gear 402d in one fixed position using, for example, a typical automatic transmission band brake, although other techniques of fixing can be used, and (2) declutching feedback sun gear 402a from turbine 104b and clutching feedback sun gear 402a to impeller 104a. The resulting gear ratio in this scenario is:

$GR_{R2} = PR/(PR-1)$, where the subscript R2 denotes reverse mode of FIG. 4, and PR is the planet ratio described earlier. For example, for a heavy duty truck, PR=0.9, in which case $GR_{R2} = -9$.

With appropriate use of additional clutches and brakes, reverse mode could be achieved on demand while having torque converter 104 run in the same direction for both forward and reverse modes.

3. Low Mode: For certain applications it may be desirable to hold the continuously variable transmission system 100 and continuously variable transmission system 400 in a lowest possible ratio corresponding to "low" in a conventional automatic transmission. This can be accomplished according to various embodiments of the present invention.

For continuously variable transmission system 100 configuration, applying a band brake to ring gear 102c and driving feedback gear 118 from output shaft 108 will keep continuously variable transmission system 100 in a lowest possible gear ratio independent of the value of torque converter 104's slip ratio. Low gear can be similarly obtained for continuously variable transmission system 400 configuration of FIG. 4 by fixing feedback sun gear 402a with a band brake and declutching feedback gear 410 from feedback sun gear 402a, although other techniques can also be used for the "low" mode.

4. Drive Mode: Irrespective of the specific gearing chosen for the intended application, when continuously variable transmission system 100 and/or continuously variable transmission system 400 are in a "drive" mode, continuously variable transmission system 100 and/or continuously variable transmission system 400 will start from a stop in the lowest possible gear ratio and smoothly move towards the 1:1 (or overdrive) high gear ratio as an output speed of output shaft 108 increases. If the continuously variable transmission system 100 and/or continuously variable transmission system 400 is highly loaded due to rapid acceleration, hill-climbing or other high loading (like from deep off-road mud), continuously variable transmission system 100 and/or continuously variable transmission system 400 will remain in an intermediate gear ratio automatically and smoothly by virtue of design, without any special hydraulic or electrical controls as found in typical current automatic transmission or continuously variable transmission systems.

According to other embodiments of the present invention, continuously varying transmission system 700 of FIG. 7 provides a further simplification and compactness in design as compared to continuously varying transmission systems 100 and 400 of FIG. 4. Fluid coupling unit 702 eliminates use of stator 104c and as a result continuously varying transmission system 700 can spin freely in space. This alternative configuration can provide a continuously variable transmission-like speed change for planetary gear set 102 itself, where planetary gear set 102 starts at a set ratio, e.g., 4:1 at 100% slip of fluid coupling unit 702 and moves toward 1:1 as the slip of fluid coupling unit 702 approaches zero.

According to one embodiment of the present invention, continuously varying transmission system 700 can be advantageously utilized, for example, when starting up a large horsepower AC electric motor. In this scenario, getting the motor up to operating speed, particularly if it starts up under load, requires an excessive amount of initial current leading to a huge energy loss and possible motor damage before the motor gets near its efficient operating synchronous speed. One popular solution is to connect the motor to the load though a fluid coupling. However standard fluid couplings do not usually provide enough startup slip for typical applications, so more complex schemes have been developed where the coupling starts up with little fluid in it (which causes it to slip excessively). As the motor and load come up to speed, fluid is pumped into fluid coupling unit 702 at an appropriate rate from one or more external reservoirs to progressively reduce slippage. This keeps the motor current levels down to an acceptable level. The resulting effect is the same as that obtained by lowering the angular velocity of the coupling by a speed factor.

Because fluid coupling unit 702 is initially operating at a lower speed than the motor and because fluid coupling unit 702 sees a higher torque load than the actual load on output shaft 108, fluid coupling unit 702 will initially slip by considerably more than what it would operating on its own with no planetary gear set 102 installed. Thus by integrating the simple planetary gear set 102 with fluid coupling unit 702, a soft start for the electric motor is produced without the need of a complex multi-cavity fluid filling system for fluid coupling unit 702. Similar effects are also produced with compound planetary gear set 402 with fluid coupling unit 702

Furthermore, as is the case for most fluid coupling applications, to avoid energy losses at normal operating conditions, a lock-up device is installed that prevents slippage between the coupling impeller 104a and turbine 104b components. For fluid coupling unit 702, this can be accomplished by installing a centrifugal clutch between a housing for carrier arm 102d and another housing for ring gear 102c. The clutch would be designed to fully engage at a speed just below the lowest normal operating speed for the electric motor load combination. Centrifugal clutches operate without any external controls. Thus fluid coupling unit 702, according to an embodiment of the invention, can be a self-contained purely mechanical device with no electronic, pneumatic or hydraulic controls required for its operation.

Further, although exemplary embodiments of gear-based continuously variable transmission systems are illustrated in FIGS. 1-7, the present invention can be utilized in a variety of other different embodiments. In these embodiments of the present invention, an output of a slipping power transmitting device, such as a rotary coupling unit (torque converter 104 or fluid coupling unit 702), is advantageously connected to one of the traditionally fixed gears in a planetary gear train. The present invention can be utilized with any of the twelve fundamental planetary gear train configurations, or combinations thereof, well known to those skilled in the art. Additionally, although torque converter 104 and fluid coupling unit 702 are illustrated herein as examples of power transmitting slipping devices in the embodiments illustrated in FIGS. 1-7, other types and numbers of power transmitting devices that exhibit slip could be used, e.g., a viscous coupling that would work similar to fluid coupling unit 702 described herein.

Accordingly, as illustrated by the description herein the present invention provides a number of advantages including providing built-in velocity feedback of the output angular velocity of output shaft 108 to an input of planetary gear set 102 (or, to an input of compound planetary gear set 402). Thus, planetary gear set 102 (or, compound planetary gear set 402)) is put in a mode of being a multi-input system where at least one of the inputs is the fed back output, and at least another input being an input from a power source coupled to input shaft 106.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefor, is not intended to limit the claimed processes to any order except as may be specified in the claims. Accordingly, the invention is limited only by the following claims and equivalents thereto.

What is claimed is:

1. A continuously variable transmission system comprising:
    a gear set comprising one or more sun gears, one or more planetary gears, and a planetary gear carrier arm on which the one or more planetary gears are mounted for rotational movement, the one or more sun gears and the one or more planetary gears are mounted for rotational engagement and movement with respect to each other, at least one of the one or more sun gears and the planetary gear carrier arm couples to an input shaft providing a first input to the one or more planetary gears and a portion of the gear set couples to an output shaft to receive feedback; and
    a rotary coupling unit having an input rotationally coupled to the at least one of the one or more sun gears and the planetary gear carrier arm and an output that rotationally couples to the output shaft;
    wherein the one or more planetary gears further comprises a first set of one or more planetary gears and a second set of one or more planetary gears which are coupled to the first set of planetary gears via a common shaft that is guided in a circular orbit by the planetary gear carrier arm that couples to the input shaft, while another of the one or more sun gears, which is coupled to the second set of planetary gears, is coupled to the input of the rotary coupling unit, while the at least one of the one or more sun gears which is coupled to the first set of planetary gears and directly couples to the output shaft where a portion of output of the rotary coupling unit is transferred as a second input to the one or more planetary gears.

2. The system as set forth in claim 1 further comprising a driving transfer gear unit comprising one or more driving gears that rotationally couples the another of the one or more sun gears to the input to the rotary coupling unit.

3. A method for making a continuously variable transmission system, the method comprising:
    providing a gear set comprising one or more sun gears, one or more planetary gears, and a planetary gear carrier arm on which the one or more planetary gears are mounted for rotational movement, the one or more sun gears and the one or more planetary gears are mounted for rotational engagement and movement with respect to each other, at least one of the one or more sun gears and the planetary gear carrier arm couples to an input shaft providing a first input to the one or more planetary gears and a portion of the gear set couples to an output shaft to receive feedback; and
    providing a rotary coupling unit having an input rotationally coupled to the at least one of one or more sun gears and the planetary gear carrier arm and an output that rotationally couples to the output shaft;
    wherein the one or more planetary gears further comprises a first set of one or more planetary gears and a second set of one or more planetary gears which are coupled to the first set of planetary gears via a common shaft that is guided in a circular orbit by the planetary gear carrier arm that couples to the input shaft, while another of the one or more sun gears, which is coupled to the second set of planetary gears, is coupled to the input of the rotary coupling unit, while the at least one of the one or more sun gears which is coupled to the first set of planetary gears and directly couples to the output shaft where a portion of output of the rotary coupling unit is transferred as a second input to the one or more planetary gears.

4. The method as set forth in claim 3 further comprising providing a driving transfer gear unit comprising one or more driving gears that rotationally couples the another sun gear to the input to the rotary coupling unit.

5. The system as set forth in claim 1 further comprising a housing which substantially surrounds the gear set and the rotary coupling unit, coupled to the input of the rotary coupling unit providing an input to the one or more planetary gears and where the output of the rotary coupling unit couples to the one or more planetary gears providing a second input to the one or more planetary gears at the one or more sun gears.

6. The method as set forth in claim 3 further providing a housing which substantially surrounds the gear set and the rotary coupling unit, coupled to the input of the rotary coupling unit providing an input to the one or more planetary gears and where the output of the rotary coupling unit couples to the one or more planetary gears providing a second input to the one or more planetary gears at the one or more sun gears.

* * * * *